US011693901B2

(12) United States Patent
Gorban et al.

(10) Patent No.: US 11,693,901 B2
(45) Date of Patent: Jul. 4, 2023

(54) SYSTEMS AND METHODS FOR GEOLOCATION PREDICTION

(71) Applicant: Google LLC, Mountain View, CA (US)

(72) Inventors: Alexander Gorban, Mountain View, CA (US); Yanxiang Wu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/251,240

(22) PCT Filed: Jan. 10, 2019

(86) PCT No.: PCT/US2019/013024
§ 371 (c)(1),
(2) Date: Dec. 11, 2020

(87) PCT Pub. No.: WO2020/131140
PCT Pub. Date: Jun. 25, 2020

(65) Prior Publication Data
US 2022/0262032 A1    Aug. 18, 2022

Related U.S. Application Data

(60) Provisional application No. 62/781,276, filed on Dec. 18, 2018.

(51) Int. Cl.
*G06F 16/783*    (2019.01)
*G06T 7/73*    (2017.01)
(Continued)

(52) U.S. Cl.
CPC .............. *G06F 16/783* (2019.01); *G06T 7/73* (2017.01); *G06V 10/454* (2022.01);
(Continued)

(58) Field of Classification Search
CPC ............ G06T 7/73; G06T 2207/10016; G06T 2207/20081; G06T 2207/20084;
(Continued)

(56) References Cited

U.S. PATENT DOCUMENTS 8,990,134 B1 *  3/2015  Snoek ................... G06F 16/783
706/45

FOREIGN PATENT DOCUMENTS

JP    2009/251793    10/2009

OTHER PUBLICATIONS

Weyand, Tobias, Ilya Kostrikov, and James Philbin. "Planet-photo geolocation with convolutional neural networks." European Conference on Computer Vision. Springer, Cham, 2016. (Year: 2016).*

(Continued)

*Primary Examiner* — Amandeep Saini
(74) *Attorney, Agent, or Firm* — Dority & Manning, P.A.

(57) ABSTRACT

In one example embodiment, a computer-implemented method for extracting information from imagery includes obtaining data representing a sequence of images, at least one of the sequence of images depicting an object. The method includes inputting the sequence of images into a machine-learned information extraction model that is trained to extract location information from the sequence of images. The method includes obtaining as an output of the information extraction model in response to inputting the sequence of images, data representing a real-world location associated with the object depicted in the sequence of images.

17 Claims, 11 Drawing Sheets

(51) Int. Cl.
*G06V 10/82* (2022.01)
*G06V 10/774* (2022.01)
*G06V 10/764* (2022.01)
*G06V 10/44* (2022.01)
*G06V 20/00* (2022.01)

(52) U.S. Cl.
CPC .......... *G06V 10/764* (2022.01); *G06V 10/774* (2022.01); *G06V 10/82* (2022.01); *G06V 20/38* (2022.01); *G06T 2207/10016* (2013.01); *G06T 2207/20081* (2013.01); *G06T 2207/20084* (2013.01); *G06T 2207/30244* (2013.01)

(58) Field of Classification Search
CPC .......... G06T 2207/30244; G06T 2207/30252; G06V 10/764; G06V 10/774; G06V 10/82; G06V 10/25; G06V 10/255; G06V 20/56; G06V 20/58; G06V 20/38; G06V 30/191; G06V 2201/10; G06N 3/0454; G06N 3/088; G06N 3/049; G06N 3/0445; G06N 3/08; G06K 9/6267; G06K 9/6256; G05D 1/0088; G05D 1/0246
See application file for complete search history.

(56) References Cited

OTHER PUBLICATIONS

Furnari, Antonino, Giovanni Maria Farinella, and Sebastiano Battiato. "Recognizing personal locations from egocentric videos." IEEE Transactions on Human-Machine Systems 47.1 (2016): 6-18. (Year: 2016).*

Zhang, Yuqi, Yongzhen Huang, and Liang Wang. "What makes for good multiple object trackers?." 2016 IEEE International Conference on Digital Signal Processing (DSP). IEEE, 2016. (Year: 2016).*

Doulamis, Nikolaos, and Anastasios Doulamis. "Semi-supervised deep learning for object tracking and classification." 2014 IEEE international conference on image processing (ICIP). IEEE, 2014. (Year: 2014).*

Bappy, Jawadul H., Sujoy Paul, and Amit K. Roy-Chowdhury. "Online adaptation for joint scene and object classification." European Conference on Computer Vision. Springer, Cham, 2016. (Year: 2016).*

Kendall, Alex, Matthew Grimes, and Roberto Cipolla. "Posenet: A convolutional network for real-time 6-dof camera relocalization." Proceedings of the IEEE international conference on computer vision. 2015. (Year: 2015).*

International Search Report for Application No. PCT/US2019/013024, dated Apr. 12, 2019, 6 pages.

Weyand et al., "PlaNet—Photo Geolocation with Convolutional Neural Networks", Sep. 17, 2016, Proceedings of the International Conference on Advanced Biometrics, Springer, Berlin, Germany, pp. 37-55.

Zhao et al., "Video Question Answering via Hierarchical Spatio-Temporal Attention Networks" Proceedings of the Twenty Sixth International Joint Conference on Artificial Intelligence, Aug. 1, 2017, pp. 3518-3524.

International Preliminary Report on Patentability for Application No. PCT/US2019/013024, dated Jul. 1, 2021, 9 pages.

* cited by examiner

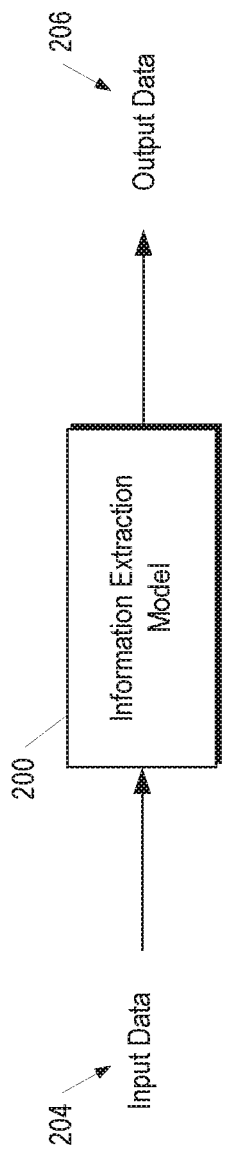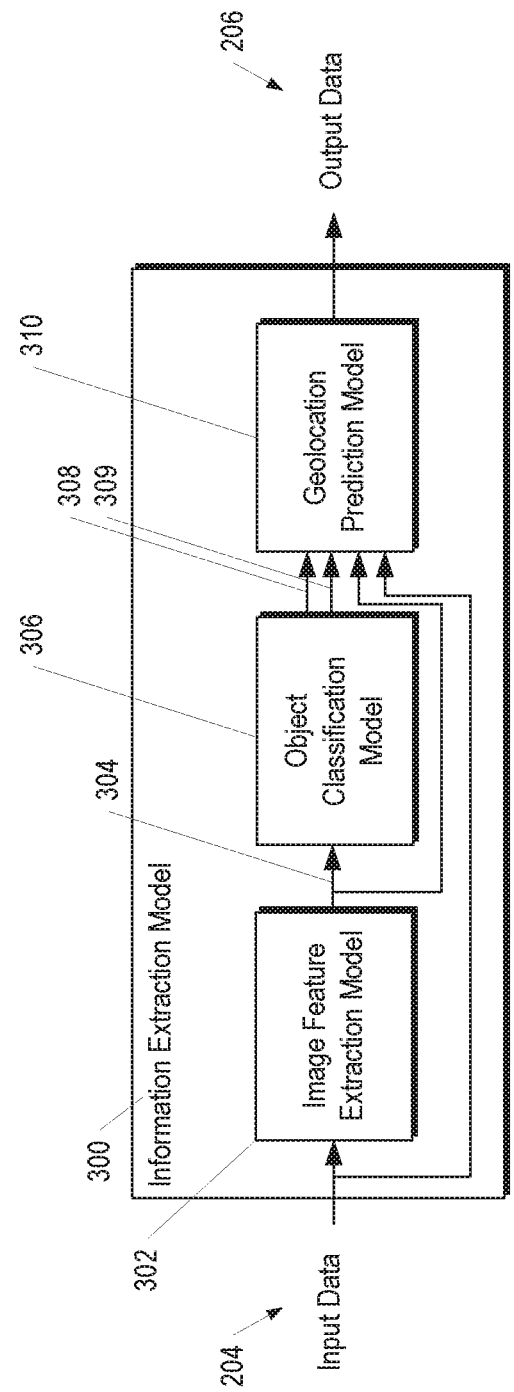

SYSTEMS AND METHODS FOR GEOLOCATION PREDICTION

PRIORITY CLAIM

The present application is a national stage filing under 35 U.S.C. § 371 of Patent Cooperation Treaty Application Serial No. PCT/US2019/013024, filed on Jul. 10, 2019, which claims the benefit of U.S. Provisional Application 62/781,276 having a filing date of Dec. 18, 2018. Applicant claims priority to and the benefit of each of such applications and incorporate all such applications herein by reference in their entirety.

FIELD

The present disclosure relates generally to predicting a real-world location (e.g., geolocation) for one or more objects. More particularly, the present disclosure relates to an information extraction model that can be trained in an unsupervised manner to predict the real-world location(s) for the object(s).

BACKGROUND

One of the main bottlenecks for extracting data from imagery using machine-learned models is a high cost of getting enough data to train such models. Getting ground truth data including real-world coordinates for any object is a very time consuming process. In most cases, getting enough ground truth data to train a neural network to predict a real-world location is impractical. Another problem is a rapid growth in various types of data needing to be extracted from the imagery.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for extracting information from imagery. The method includes obtaining, at a computing system comprising one or more processors, data representing a sequence of images, at least one of the sequence of images depicting an object. The method includes inputting, by the computing system, the sequence of images into a machine-learned information extraction model that is trained to extract location information from the sequence of images. The method includes obtaining as an output of the information extraction model in response to inputting the sequence of images, by the computing system, data representing a real-world location associated with the object depicted in the sequence of images.

Another example aspect of the present disclosure is directed to a computing system. The computing system includes one or more processors, one or more machine-learned information extraction models, and one or more tangible, non-transitory, computer readable media that collectively store instructions that when executed by the one or more processors cause the computing system to perform operations. The operations include obtaining data representing a sequence of images, at least one of the sequence of images depicting an object. The operations include inputting the sequence of images into a machine-learned information extraction model that is trained to extract location information from the sequence of images. The operations include obtaining as an output of the information extraction model in response to inputting the sequence of images, data representing a real-world location associated with the object depicted in the sequence of images.

Another example aspect of the present disclosure is directed to one or more tangible, non-transitory, computer-readable media storing one or more machine-learned information extraction models and computer-readable instructions that when executed by one or more processors cause the one or more processors to perform operations. The operations include obtaining data representing a sequence of images, at least one of the sequence of images depicting an object. The operations include inputting the sequence of images into a machine-learned information extraction model that is trained to extract location information from the sequence of images. The operations include obtaining as an output of the information extraction model in response to inputting the sequence of images, data representing a real-world location associated with the object depicted in the sequence of images.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example information extraction model, according to example embodiments of the present disclosure;

FIG. 3 depicts a block diagram of an example information extraction model, according to example embodiments of the present disclosure;

Figure 1A:
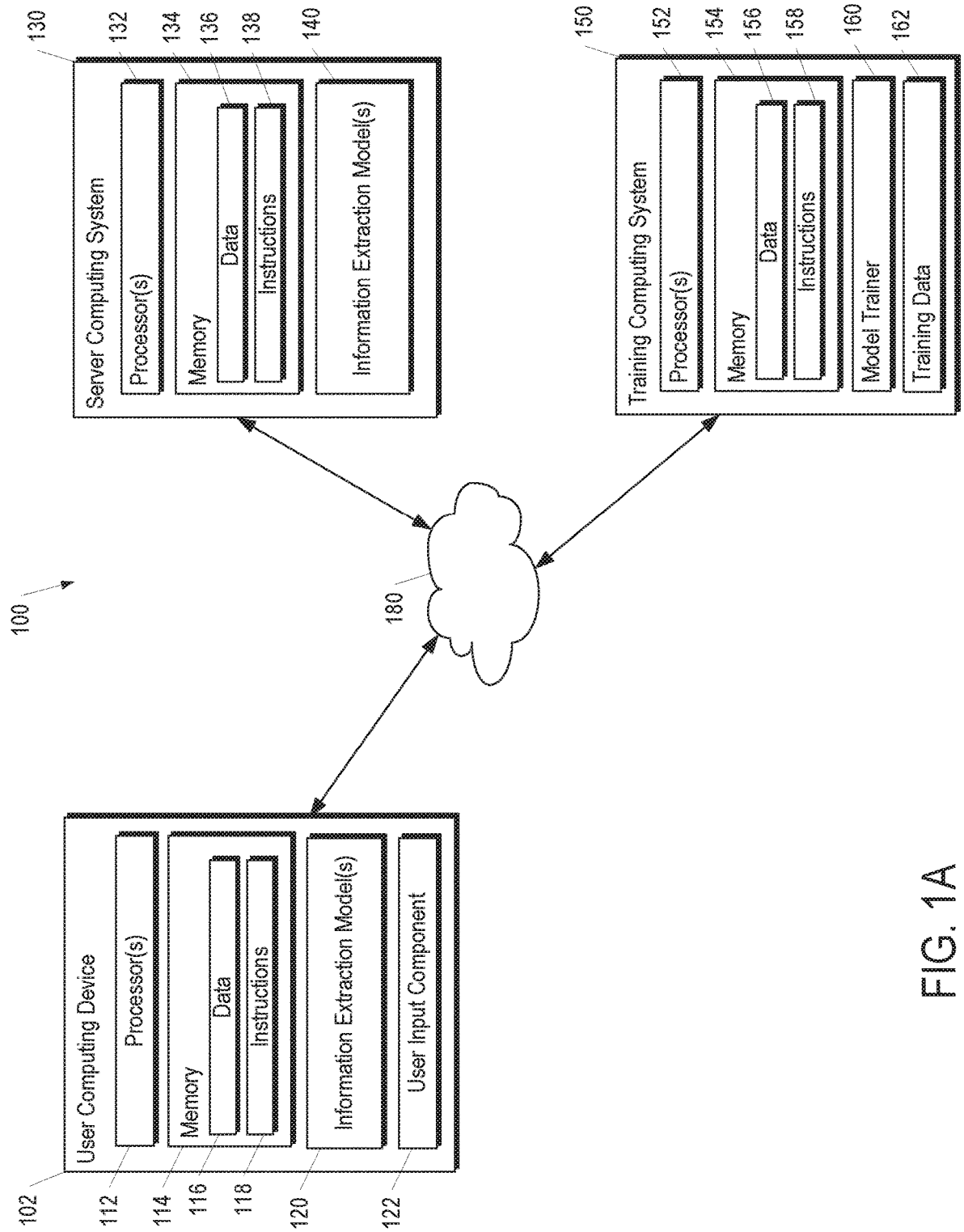
FIG. 1A-1C depict block diagrams of example computing systems/devices that can extract location information from a sequence of images, according to example embodiments of the present disclosure.

Reference numerals that are repeated across plural figures are intended to identify the same features in various implementations.

DETAILED DESCRIPTION

Overview

Systems and methods consistent with the present disclosure can include an information extraction model that can be used to determine a predicted real-world location (e.g., latitude and longitude) for one or more objects (e.g., street signs) depicted in a plurality of images. The information extraction model can be trained to predict the real-world locations of the one or more objects using image data with noisy classification. By enabling the ability to exploit large amounts of noisy labeled data and extremely large amounts of unlabeled data, the present disclosure can enable the development of models for more applications faster and cheaper. The present disclosure can also enable many new applications for which sufficient ground truth location data is unavailable. Additionally, since the information extraction model can be trained without the need for ground truth location data (e.g., as target values of a regression), the information extraction model can be trained as an end-to-end model in an unsupervised manner to predict the real-world locations of objects, with only weak supervision to classify the objects. Numerous experiments have demonstrated that the information extraction model of the present disclosure works and is able to reach a level of accuracy comparable with traditional fully supervised models using the same training data and testing dataset but without requiring ground truth labels, object bounding boxes, and strong supervision in model training.

According to aspects of the present disclosure, a computing system comprising one or more processors can be used to help implement aspects of the disclosed technology including the information extraction model. In some implementations, the computing system can obtain image data. The image data can include a plurality of images, such as, for example, a sequence of image frames. The sequence of image frames can depict one or more objects (e.g., street signs) in a scene. As an example, one or more image frames in the sequence of image frames can depict one or more objects. As another example, a plurality of image frames in the sequence of image frames can depict the same object. The plurality of image frames depicting the same object can be consecutive image frames or non-consecutive image frames in the sequence of image frames. In some implementations, the sequence of image frames can depict a scene proximate to a street from a perspective of a vehicle traversing the street. In some implementations, one or more image frames in the sequence of image frames can correspond to one or more frames of a video, or other type of motion capture.

In some implementations, the image data can include a classification associated with the sequence of image frames. For example, the image data can include a single classification label associated with the sequence of image frames. Alternatively, the image data can include more than one classification label associated with one or more image frames in the sequence of image frames. As described further below, according to aspects of the present disclosure, the system can use the information extraction model to obtain data representing a real-world location of an object based at least in part on a sequence of image frames with noisy classification (e.g., a single classification label associated with the sequence of image frames).

In some implementations, the image data can include camera pose data. The camera pose data can represent a real-world position and/or orientation of a camera used to capture one or more image frames in the sequence of image frames. For example, the camera pose data can include 4×4 camera-to-world projection matrices.

According to aspects of the present disclosure, the system can generate geolocation data. The geolocation data can include a predicted real-world location (e.g., latitude and longitude) for one or more objects (e.g., street signs) depicted in a sequence of image frames. The information extraction model can be configured to receive the image data, and output the geolocation data in response to receiving the image data.

The system can input the image data into the information extraction model, and obtain the geolocation data as an output of the information extraction model in response to inputting the image data. The system can use the geolocation data to, for example, identify a road segment corresponding to the street sign (e.g., a road segment that is at or near a latitude and longitude of the street sign). For example, the image data can include a sequence of image frames depicting a speed limit sign. The system can input the image data into the information extraction model, and obtain geolocation data that includes a predicted real-world location of the speed limit sign as an output of the information extraction model. The system can use the geolocation data to identify a road segment corresponding to the speed limit sign (e.g., a road segment that is at or near the predicted real-world coordinates of the speed limit sign).

According to aspects of the present disclosure, the information extraction model can include a plurality of machine-learned models such as, for example, an image-feature extraction model, an object classification model, and a geolocation prediction model. In some implementations, the information extraction model and/or the plurality of machine-learned models included in the information extraction model (e.g., the image-feature extraction model, object classification model, geolocation prediction model, etc.) can be or can otherwise include various machine-learned models such as neural networks (e.g., deep neural networks) or other types of machine-learned models, including non-linear models and/or linear models. Neural networks can include feed-forward neural networks, recurrent neural networks (e.g., long-short term memory recurrent neural networks), convolutional neural networks or other forms of neural networks.

In some implementations, the image-feature extraction model can generate image-feature data including one or more image features extracted from one or more image frames in the sequence of image frames. The image-feature extraction model can be configured to receive data representing the sequence of image frames (e.g., the image data), and output the image-feature data in response to receiving the sequence of image frames. As described further below, according to aspects of the present disclosure, the one or more image features in the image-feature data can be used to identify and/or classify one or more objects depicted in the sequence of image frames. In some implementations, the image-feature data can include a sequence of image features. For example, the one or more image features in the image-feature data can be organized into a sequence of image-feature embeddings. Each image-feature embedding in the sequence of image-feature embeddings can correspond to an image frame in the sequence of image frames, and each image-feature embedding can represent one or more image features extracted from the corresponding image frame. In some implementations, the image-feature extraction model can include a convolutional neural network (CNN) such as, for example, Inception v2, any SoTA image classification network (or its bottom part), etc.

The system can input data representing the sequence of image frames (e.g., the image data) into the image-feature extraction model, and obtain the sequence of image features (e.g., the image-feature data) as an output of the image-feature extraction model in response to inputting the sequence of image frames. As described further below, the system can use the information extraction model to determine geolocation data based at least in part on the image-feature data.

In some implementations, the object classification model can generate classification data and attention value data. The object classification model can be configured to receive data representing a sequence of image features (e.g., the image-feature data output by the image-feature extraction model), and output the classification data and attention value data in response to receiving the sequence of image features and associated image-feature embeddings. In some implementations, the object classification model can include a weakly supervised recurrent neural network (RNN).

The classification data can represent a classification associated with one or more objects depicted in the sequence of image frames. For example, the object classification model can identify the one or more objects based at least in part on the sequence of image features, and determine one or more classification labels associated with the one or more identified objects. The one or more objects can be depicted in some or all of the image frames in the sequence of image frames. As another example, the object classification model can receive data representing a sequence of image features extracted from image data including a sequence of image frames depicting a speed limit sign. In response to receiving the sequence of image features, the object classification model can output classification data including a classification label indicative of a speed limit value corresponding to the speed limit sign.

The attention value data can represent, for example, a probability that a classified object is present at a specific pixel in a specific frame. The attention value data can include one or more temporal attention values and one or more spatial attention values associated with the sequence of image features. As an example, the image-feature data can include a sequence of image-feature embeddings representing the sequence of image features. The object classification model can determine a temporal attention value and a spatial attention value for each image-feature embedding in the sequence of image-feature embeddings. The temporal attention value and spatial attention value for each image-feature embedding can represent a probability that a classified object is present at a specific pixel in an image frame corresponding to the image-feature embedding. Additionally or alternatively, the object classification model can determine a single temporal attention value and a single spatial attention value for the sequence of image features (e.g., the sequence of image-feature embeddings).

The system can input data representing the sequence of image features (e.g., the image-feature data) into the object classification model, and obtain the classification data and attention value data as an output of the object classification model in response to inputting the sequence of image features. As described further below, the system can use the information extraction model to determine geolocation data based at least in part on the classification data and the attention value data.

In some implementations, the object classification model can include a long-short term memory (LSTM) with a spatio-temporal attention mechanism. The spatio-temporal attention mechanism can be used to determine the attention value data and enable the object classification model to be effectively trained using only weak supervision. For example, the object classification model can include a plurality of LSTM blocks that each output a per-frame embedding based on a sequence of image features (e.g., the image-feature data) input into the object classification model. The object classification model can use temporal attention to weight the per-frame embeddings produced by the LSTM blocks in order to determine the output of the object classification model. In this way, gradients from the output are distributed between each LSTM block proportionally to the corresponding weight of the temporal attention all together, at the same time step.

In some implementations, the object classification model can be trained based at least in part on a loss associated with the classification data output by the object classification model. For example, the system can determine a softmax cross entropy loss based at least in part on one or more classification labels in the classification data and a classification associated with the sequence of image frames in the image data (e.g., a single classification label associated with the sequence of image frames). The system can use the determined softmax cross entropy to train the object classification model.

In some implementations, the information extraction model can include a geolocation prediction model that can generate geolocation data. The geolocation prediction model can be configured to receive data representing a sequence of image features (e.g., the image-feature data output by the image-feature extraction model), data representing a position and/or orientation associated with one or more cameras used to capture the sequence of image frames corresponding to the sequence of image features (e.g., camera pose data in the image data), and data representing attention values associated with the sequence of image features (e.g., attention value data generated by the object classification model). The geolocation prediction model can be configured to output the geolocation data in response to receiving the sequence of image features, camera position and/or orientation information, and attention values associated with the sequence of image features. The system can input the image-feature data, camera pose data, and attention value data into the geolocation prediction model, and obtain the geolocation data as an output of the geolocation prediction model in response to inputting the image-feature data, camera pose data, and attention value data.

In some implementations, the geolocation prediction model can generate a single embedding vector associated with each of one or more a classified objects. For example, the single embedding vector can encode all data related to the associated classified object from the sequence of image features. The geolocation prediction model can use the single embedding vector to predict a real-world location associated with the associated classified object.

In some implementations, the geolocation prediction model can include a frame-level location-feature extraction model and a frame-level location prediction model. The frame-level location-feature extraction model can be configured to receive data representing a sequence of image features (e.g., the image-feature data output by the image-feature extraction model), and output location-feature data including one or more location features associated with one or more classified objects, in response to receiving the sequence of image features. As will be described further below, according to aspects of the present disclosure, the one or more location features in the location-feature data can be used to predict a real-world location for the one or more classified objects. In some implementations, the location-feature data can include a sequence of location features. For example, the one or more location features in the location-feature data can be organized into a sequence of location-feature embeddings. Each location-feature embedding in the sequence of location-feature embeddings can correspond to an image frame in the sequence of image frames, and each location-feature embedding can represent one or more location features associated with one or more classified objects depicted in the corresponding image frame.

The system can input the image-feature data into the frame-level location-feature extraction model, and obtain the location-feature data as an output of the frame-level location-feature extraction model. For example, the image-feature data can include a sequence of image-feature embeddings representing a sequence of image features and corresponding to a sequence of image frames. The system can input data representing image features associated with an image frame (e.g., an image-feature embedding in the sequence of image-feature embeddings) into the frame-level location-feature extraction model, and obtain location-feature data including a location-feature embedding that represents one or more location features associated with the image frame (e.g., associated with one or more classified objects depicted in the image frame) as an output of the frame-level location-feature extraction model. In this way, the system can input each image-feature embedding in the sequence of image-feature embeddings into the frame-level location-feature extraction model, and obtain location-feature data including a sequence of location-feature embeddings representing a sequence of location features and corresponding to the sequence of image frames.

The frame-level location prediction model can be configured to receive data representing a sequence of location features (e.g., the location-feature data output by the frame-level location-feature extraction model), and output coordinate data including coordinates associated with one or more classified objects in response to receiving the sequence of location features. In some implementations, the coordinate data can include a sequence of coordinate embeddings corresponding to the sequence of image frames. Each coordinate embedding can represent coordinates associated with one or more classified objects depicted in the corresponding image frame. The coordinates associated with a classified object depicted in an image frame can indicate a three-dimensional position of the classified object in a camera coordinate space associated with the image frame.

The system can input the location-feature data into the frame-level location prediction model, and obtain the coordinate data as an output of the frame-level location prediction model. For example, the location-feature data can include a sequence of location-feature embeddings representing a sequence of location features and corresponding to the sequence of image frames. The system can input data representing location features associated with an image frame (e.g., a location-feature embedding in the sequence of location-feature embeddings) into the frame-level location prediction model, and obtain coordinate data including a coordinate embedding that represents coordinates associated with one or more classified objects depicted in the image frame as an output of the frame-level location prediction model. In this way, the system can input each location-feature embedding in the sequence of location-feature embeddings into the frame-level location prediction model, and obtain coordinate data including a sequence of coordinate embeddings representing a sequence of coordinates and corresponding to the sequence of image frames.

The geolocation prediction model can be configured to determine a predicted real-world location associated with one or more classified objects based at least in part on the coordinate data output by the frame-level location prediction model and camera pose data. In some implementations, the geolocation prediction model can be configured to determine a predicted real-world location for one or more classified objects by converting the coordinates associated with a classified object in the coordinate value data from the camera coordinate space to real-world coordinates (e.g., latitude and longitude). For example, the geolocation prediction model can determine that a classified object is depicted in a plurality of image frames in the sequence of image frames. The geolocation prediction model can obtain coordinates associated with the classified object for each of the plurality of image frames based at least in part on the coordinate data, and convert the plurality of coordinates associated with the classified object into real-world coordinates (e.g., latitude and longitude) based at least in part on the camera pose data. For example, the geolocation prediction model can convert a three-dimensional position of a classified object in a camera coordinate space associated with an image frame into real-world coordinates of the classified object based on a position and/or orientation of a camera used to capture the image frame. In this way, the system can determine a temporal weighted average of a plurality of real-world coordinates associated with a classified object to determine a predicted real-world location of the classified object.

In some implementations, the geolocation prediction model can be configured to verify the coordinate data output by the frame-level location prediction model, and determine the predicted real-world coordinates based on the verification. As an example, the geolocation prediction model can verify that coordinates associated with an identified object are accurate. As another example, the geolocation prediction model can verify that coordinates associated with an identified object across multiple image frames correspond to the same identified object.

In some implementations, the geolocation prediction model can be trained based at least in part on one or more of a plurality of loss values, in order to make sure that a predicted real-world location is accurate and corresponds to a classified object that is of interest. The plurality of loss values can include a location consistency loss, an appearance consistency loss, an aiming loss, and a field-of-view (FOV) loss. As an example, the system can determine the location consistency loss based at least in part on a variance between coordinates associated with an identified object across multiple image frames. The system can use the determined location consistency loss to train the geolocation prediction model so that coordinates determined by the geolocation prediction model are consistent across the multiple image frames for the classified object.

As another example, the system can determine the appearance consistency loss based at least in part on the image-feature data (e.g., output by the image-feature extraction model) and the attention value data (e.g., output by the object classification model). In particular, the system can weigh image features corresponding to an image frame with a spatial attention value included in the attention value data to determine appearance features for multiple image frames, and the system can determine the appearance consistency loss based at least in part on a variance between the determined appearance features across the multiple image frames. The system can use the determined appearance consistency loss to train the geolocation prediction model so that one or more objects that are classified by the geolocation prediction model have a similar visual appearance in each image frame that the object is visible.

As another example, the system can determine the aiming loss based at least in part on the coordinate data (e.g., output by the frame-level location prediction model) and the attention value data (e.g., output by the object classification model). The system can use the aiming loss to train the geolocation prediction model so that the coordinates in the coordinate data associated with a classified object depicted in an image frame are projected in the camera coordinate space associated with the image frame in an area where spatial attention associated with the classified object is highest.

As another example, the system can determine the FOV loss to constrain predicted real-world coordinates within an actual possible FOV of a camera used to capture the image frames based on which the predicted real-world coordinates are determined. The system can use the determined FOV loss to train the geolocation prediction model in order to include meaningful limits (e.g., a reasonable space) on the scope of the predicted real-world coordinates.

The systems and methods described herein may provide a number of technical effects and benefits. For instance, a computing system can include one or more information extraction models that can extract location information from data representing imagery with noisy classification. The information extraction model(s) can be trained end-to-end to predict real-world locations of one or more objects depicted in the imagery with noisy classification. For example, the information extraction model(s) can be used to predict real-world locations of various types of street signs, house numbers, turn restrictions, street names, etc. More particularly, the information extraction model(s) can include an object classification model and/or a geolocation prediction model. The object classification model can be trained using image data with weak classification labels (e.g., a single classification label associated with a sequence of image frames) as the supervision signal, and the geolocation prediction model can be trained in an unsupervised manner (e.g., based on a determined location consistency loss, appearance consistency loss, aiming loss, and/or FOV loss). By enabling the ability to exploit large amounts of noisy labeled data and extremely large amounts of unlabeled data, the present disclosure can enable the development of models for more applications faster and cheaper. Additionally, the location information extracted by the information extraction models can be used to enable the development of many new applications for which sufficient ground truth location data was previously unavailable. For example, the information extraction model(s) can be included in a computing system onboard a vehicle, or as part of a dashcam application, and can be used to detect objects in the real-world without the need to send data for offline processing. Furthermore, one or more components of the information extraction model(s) (e.g., image-feature extraction model, object classification model, geolocation prediction model, etc.) can be integrated into one or more other machine-learned models. For example, the object classification model with spatio-temporal attention can be used to determine a classification associated with various video content with noisy classification (e.g., to classify violent or offensive content on a video sharing platform).

Example Devices and Systems

FIG. 1A depicts a block diagram of an example geolocation system 100 that performs information extraction according to example embodiments of the present disclosure. In particular, the geolocation system 100 can predict real-world locations for one or more objects that are depicted in a plurality of images. The geolocation system 100 can correspond to a computing system that includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more information extraction models 120. For example, the information extraction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example information extraction models 120 are discussed with reference to FIGS. 2-7.

In some implementations, the one or more information extraction models 120 can be received from the server computing system 130 over network 180, stored in the user computing device memory 114, and then used or otherwise implemented by the one or more processors 112. In some implementations, the user computing device 102 can implement multiple parallel instances of a single information extraction model 120 (e.g., to perform parallel information extraction across multiple instances).

More particularly, the information extraction models 120 can be configured to receive image data, and output geolocation data in response to receiving the image data. The geolocation system 100 can input the image data into the information extraction models 120, and obtain the geolocation data as an output of the information extraction models 120 in response to inputting the image data.

Additionally or alternatively, one or more information extraction models 140 can be included in or otherwise stored and implemented by the server computing system 130 that communicates with the user computing device 102 according to a client-server relationship. For example, the information extraction model(s) 140 can be implemented by the server computing system 130 as a portion of a web service (e.g., a geolocation information extraction service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned information extraction models 140. For example, the model(s) 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the information extraction models 120 and/or 140 based on a set of training data 162. As an example, the training data 162 can include weakly classified image data, such as image data including a single classification label associated with a sequence of image frames. The model trainer 160 can train an object classification model included in the information extraction model 120 and/or 140 by using the image data with weak classification. As another example, the training data 162 can include more than one classification labels associated with a sequence of image frames, and the model trainer 160 can train an object classification model included in the information extraction model 120 and/or 140 by using the image data with more than one classification labels. As another example, the training data 162 can include data provided as an input to the information extraction models 120 and/or 140, and data provided as an output of the information extraction models 120 and/or 140 in response to the input data. The model trainer 160 can train a geolocation prediction model included in the information extraction models 120 and/or 140 in an unsupervised manner by using the input data and the output data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
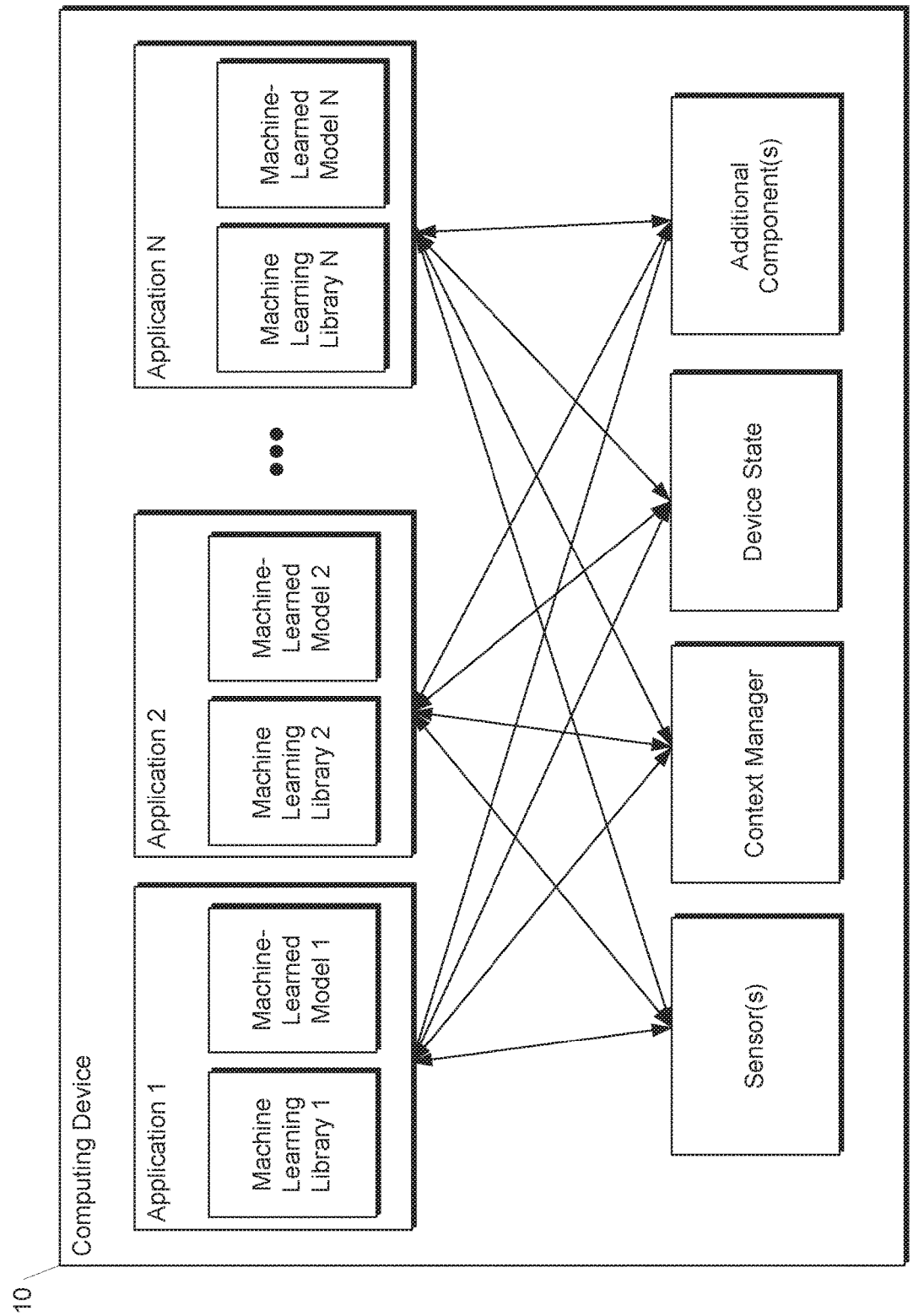

FIG. 1B depicts a block diagram of an example computing device 10 that performs information extraction according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
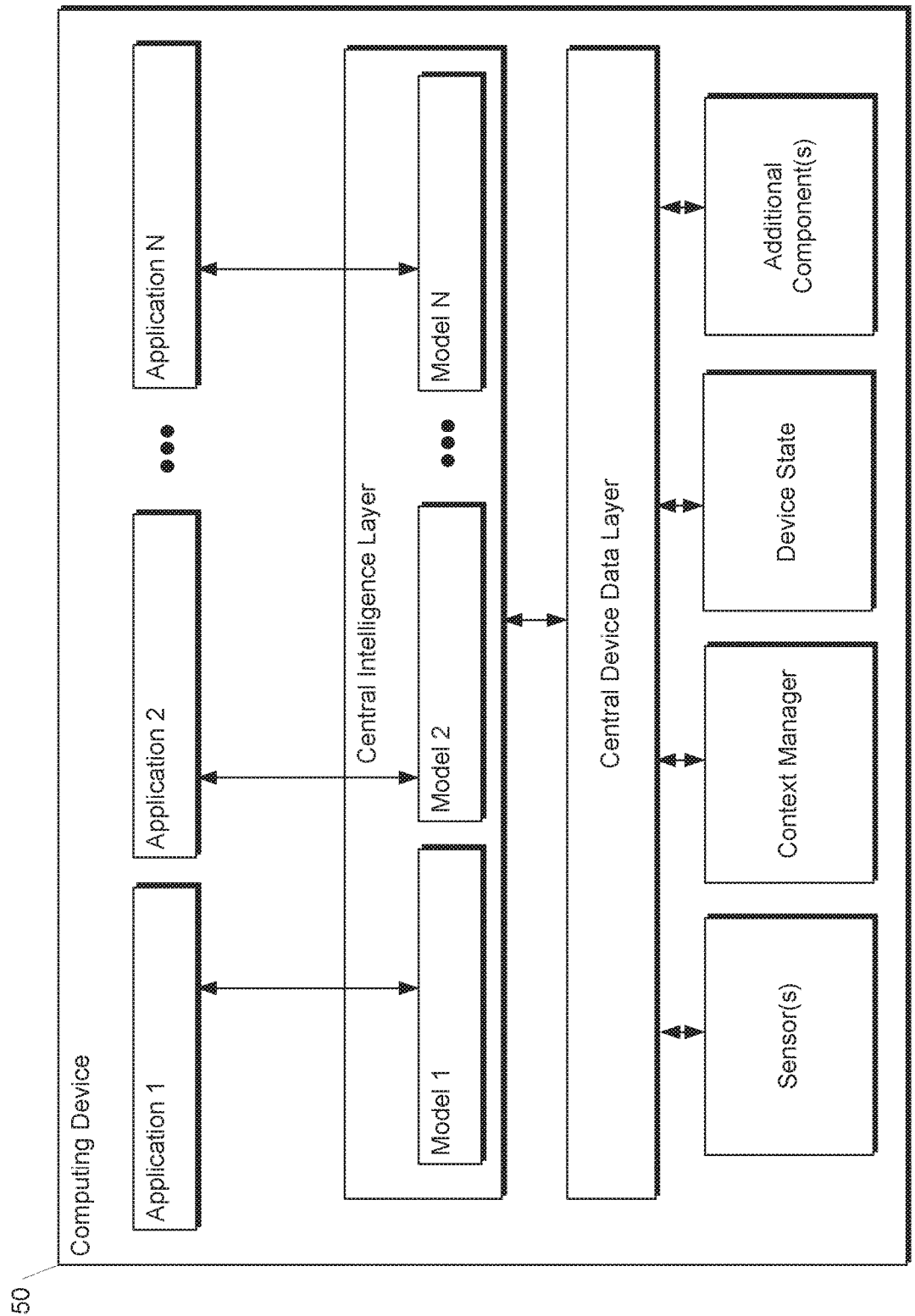

FIG. 1C depicts a block diagram of an example computing device 50 that performs information extraction according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 depicts a block diagram of an example information extraction model 200 according to example embodiments of the present disclosure. In some implementations, the information extraction model 200 is trained to receive a set of input data 204 (e.g., image data) descriptive of a plurality of images, such as, for example, a sequence of image frames and, as a result of receipt of the input data 204, provide output data 206 (e.g., geolocation data) that includes a predicted real-world location for one or more objects depicted in the sequence of image frames. In some implementations, the input data 204 can include camera pose data indicative of a real-world position and/or orientation of a camera used to capture one or more image frames in the sequence of image frames.

FIG. 3 depicts a block diagram of an example information extraction model 300 according to example embodiments of the present disclosure. The information extraction model 300 is similar to information extraction model 200 of FIG. 2 except that information extraction model 300 further includes image-feature extraction model 302, object classification model 306, and geolocation prediction model 310.

In some implementations, the image-feature extraction model 302 is trained to receive input data 204, or a portion thereof (e.g., data representing the sequence of image frames), and as a result of receipt of the input data 204, provide image-feature data 304 that includes one or more image features extracted from one or more image frames in the input data 204. In some implementations, the image-feature data 304 can include a sequence of image-feature embeddings representing a sequence of image features extracted from the one or more image frames.

Figure 5:
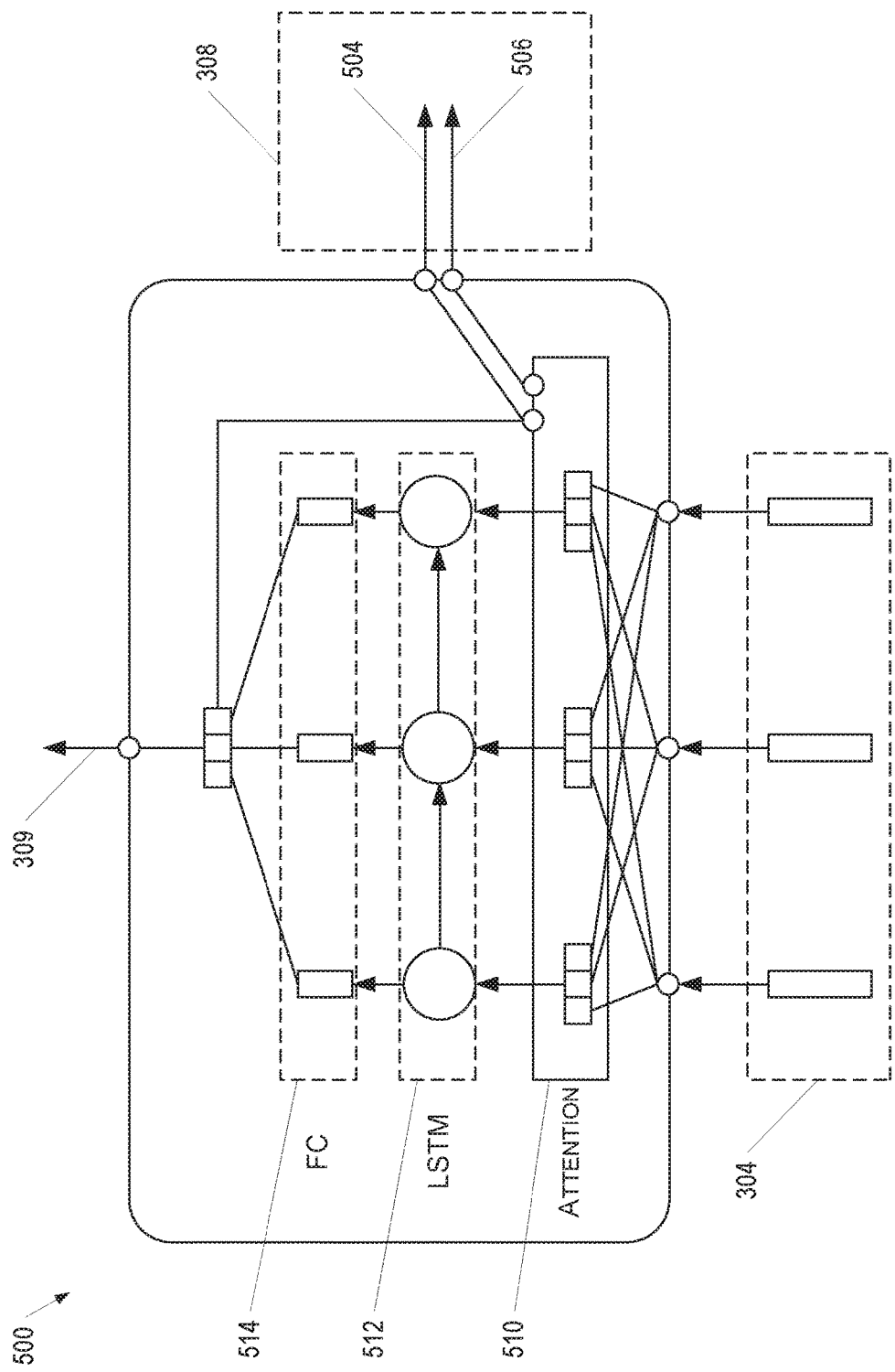
FIG. 5 depicts a block diagram of an example object classification model, according to example embodiments of the present disclosure.

In some implementations, the object classification model 306 is trained to receive the image-feature data 304 (e.g., data representing the sequence of image features), and as a result of receipt of the image-feature data 304, provide attention value data 308 and classification data 309. The attention value data 308 can include one or more temporal attention values and one or more spatial attention values associated with the sequence of image features in the image-feature data 304. The classification data 309 can include one or more classification labels associated with one or more classified objects depicted in one or more image frames of the input data 204 (e.g., a speed limit value corresponding to a speed limit sign depicted in an image frame). In some implementations, attention value data 308 can include temporal attention data representing the one or more temporal attention values (e.g., temporal attention data 504 as shown in FIG. 5) and spatial attention data representing the one or more spatial attention values (e.g., spatial attention data 506 as shown in FIG. 5).

In some implementations, the geolocation prediction model 310 is trained to receive the image-feature data 304 (e.g., data representing the sequence of image features), input data 204 or a portion thereof (e.g., data representing camera pose data), and attention value data 308, and as a result of receipt of the data, provide output data 206 (e.g., geolocation data) that includes a predicted real-world location for one or more objects depicted in the input data 204 (e.g., depicted in one or more image frames in the input data 204). The information extraction model 300 can associate the predicted real-world location for an object with a classification label corresponding to the object, based at least in part on the classification data 309.

Figure 4:
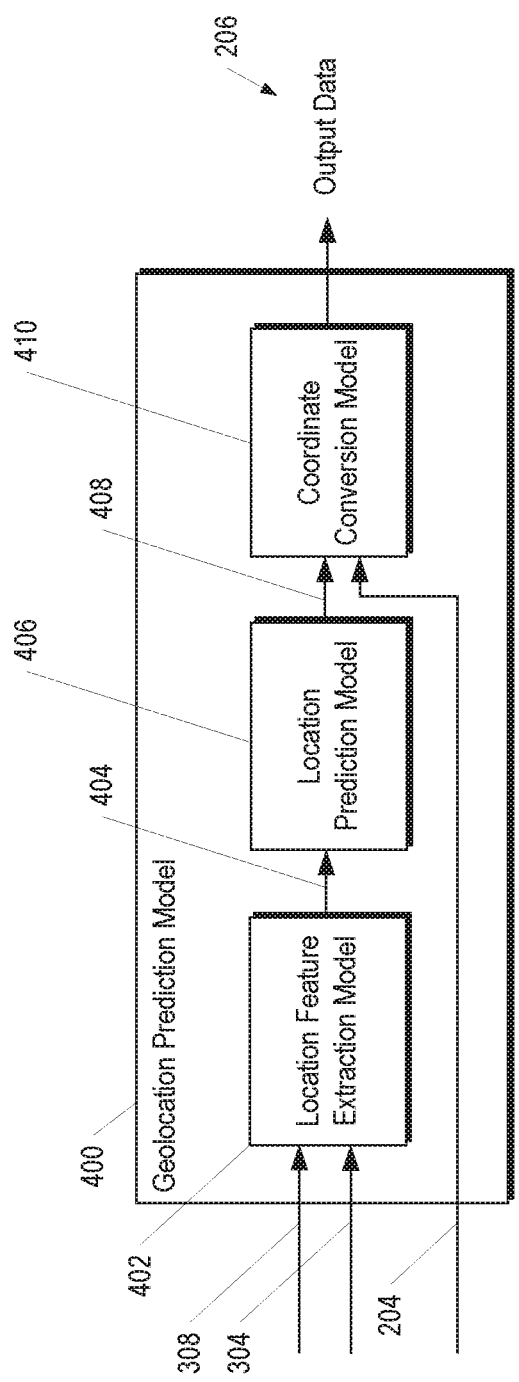
FIG. 4 depicts a block diagram of an example geolocation prediction model, according to example embodiments of the present disclosure.

FIG. 4 depicts a block diagram of an example geolocation prediction model 400 according to example embodiments of the present disclosure. The geolocation prediction model 400 is similar to geolocation prediction model 310 of FIG. 3 except that geolocation prediction model 400 further includes location feature extraction model 402, location prediction model 406, and coordinate conversion model 410.

In some implementations, the location feature extraction model 402 is trained to receive image-feature data 304 and attention value data 308, and as a result of receipt of the data, provide location-feature data 404 that includes one or more location features associated with one or more classified objects depicted in the input data 204. In some implementations, the location-feature data can include a sequence of location-feature embeddings corresponding to the sequence of image frames in input data 204. Each location-feature embedding in the sequence of location-feature embeddings can represent location features associated with one or more classified objects depicted in a corresponding image frame.

In some implementations, the location prediction model 406 is trained to receive location-feature data 404, and as a result of receipt of the location-feature data 404 provide coordinate data 408 that includes coordinates associated with one or more classified objects depicted in the input data 204. In some implementations, coordinate data 408 can include a sequence of coordinate embeddings corresponding to the sequence of image frames in input data 204. Each coordinate embedding in the sequence of coordinate embeddings can represent coordinates associated with one or more classified objects depicted in a corresponding image frame. In some implementations, coordinate data 408 can include coordinates associated with a classified object that indicate a three-dimensional position of the classified object in a camera coordinate space associated with an image frame depicting the classified object.

In some implementations, the coordinate conversion model 410 is trained to receive coordinate data 408 and at least a portion of input data 204 (e.g., the camera pose data), and as a result of receipt of the data, provide output data 206 (e.g., geolocation data). In particular, the coordinate conversion model 410 can convert coordinates associated with a classified object in a camera coordinate space to real-world coordinates (e.g., latitude and longitude values).

In some implementations, the geolocation prediction model 400 can be trained based at least in part on one or more of a plurality of loss values, in order to make sure that a predicted real-world location is accurate and corresponds to a classified object that is of interest. As an example, the geolocation system 100 can determine a location consistency loss based at least in part on a variance between coordinates associated with an identified object across multiple image frames. The geolocation system 100 can use the determined location consistency loss to train the geolocation prediction model 400 so that coordinates determined by the geolocation prediction model are consistent across the multiple image frames for the classified object. As another example, the geolocation system 100 can determine an appearance consistency loss based at least in part on the image-feature data 304 and the attention value data 308. In particular, the geolocation system 100 can weigh image features corresponding to an image frame with a spatial attention value included in the attention value data 308 to determine appearance features for multiple image frames, and the geolocation system 100 can determine the appearance consistency loss based at least in part on a variance between the determined appearance features across the multiple image frames. The geolocation system 100 can use the determined appearance consistency loss to train the geolocation prediction model 400 so that one or more objects that are classified by the geolocation prediction model have a similar visual appearance in each image frame that the object is visible. As another example, the geolocation system 100 can determine an aiming loss based at least in part on the coordinate data 408 and the attention value data 308. The geolocation system 100 can use the aiming loss to train the geolocation prediction model 400 so that the coordinates in the coordinate data 408 associated with a classified object depicted in an image frame are projected in the camera coordinate space associated with the image frame in an area where spatial attention associated with the classified object is highest. As another example, the geolocation system 100 can determine a field-of-view (FOV) loss to constrain predicted real-world coordinates within an actual possible FOV of a camera used to capture the image frames based on which the predicted real-world coordinates are determined. The geolocation system 100 can use the determined FOV loss to train the geolocation prediction model 400 in order to include meaningful limits (e.g., a reasonable space) on the scope of the predicted real-world coordinates.

FIG. 5 depicts a block diagram of an example object classification model 500 according to example embodiments of the present disclosure. The object classification model 500 is similar to the object classification model 306 of FIG. 3, except that object classification model 500 outputs classification data 309 in addition to attention value data 308.

In some implementations, the object classification model 500 is trained to receive data representing a sequence of image features (e.g., image-feature data 304), and as a result of receipt of the image-feature data 304, provide classification data 309, temporal attention data 504, and spatial attention data 506. The classification data 309 can include a classification associated with one or more objects depicted in the sequence of image frames. The temporal attention data 504 can include one or more temporal attention values associated with the sequence of image features, and the spatial attention data 506 can include one or more spatial attention values associated with the sequence of image features. In some implementations, the object classification model 500 can be trained based at least in part on the classification data 309. For example, the geolocation system 100 can determine a softmax cross entropy loss based at least in part on one or more classification labels in the classification data and a classification associated with the sequence of image frames in the input data 204. The geolocation system 100 can train the object classification model 500 based at least in part on the determined softmax cross entropy loss.

In some implementations, the object classification model 500 can include a spatio-temporal attention mechanism layer 510, a long-short term memory (LSTM) layer 512 including a plurality of LSTM blocks, and a fully connected (FC) layer 514. The spatio-temporal attention mechanism layer 510 can determine the temporal attention data 504 and spatial attention data 506, based at least in part on the image-feature data 304. Each LSTM block in the LSTM layer 512 can determine a per-frame embedding based at least in part on the image-feature data 304, and provide the per-frame embeddings to the FC layer 514 to determine one or more objects that persist across multiple image frames. The object classification model 500 can weigh the per-frame embeddings based on the temporal attention data 504 to determine the classification data 309.

Figure 6:
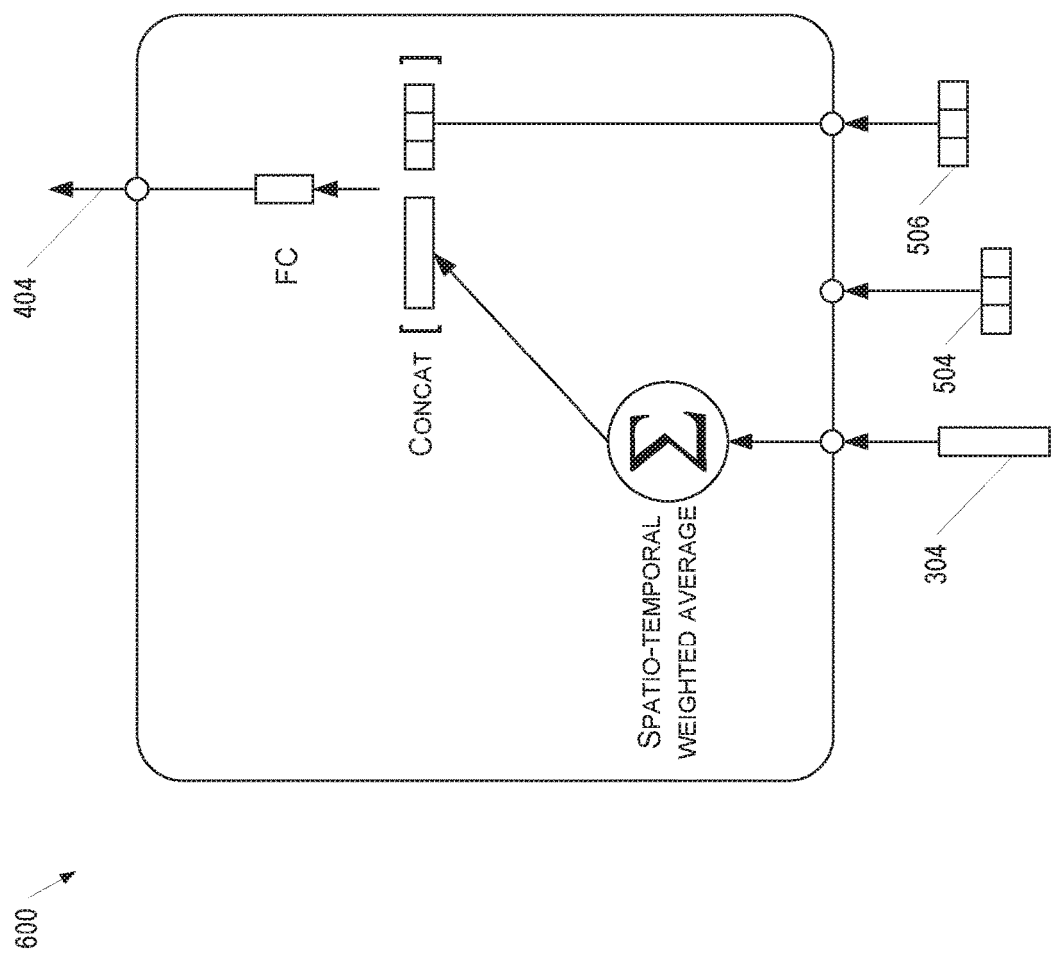
FIG. 6 depicts a block diagram of an example location-feature extraction model, according to example embodiments of the present disclosure.

FIG. 6 depicts a block diagram of an example location feature extraction model 600 according to example embodiments of the present disclosure. The location feature extraction model 600 is similar to the location feature extraction model 402 of FIG. 4, except that location feature extraction model 600 is trained to receive data representing one or more image features (e.g., image-feature data 304) that corresponds to a single image frame. As a result of receipt of the one or more image features and the attention value data 308, the location feature extraction model 600 provides location-feature data 404 including one or more location features that correspond to the single image frame. In some implementations, the geolocation system 100 can sequentially input data representing one or more image features corresponding to an image frame, for each image frame in the input data 204. In some implementations, the information extraction model 300 can include a plurality of location feature extraction models 600, and the geolocation system 100 can input data representing one or more image features in parallel. For example, if the information extraction model 300 includes a first and second location feature extraction model 600, then the geolocation system 100 can simultaneously input data representing one or more image features corresponding to a first image frame into the first location feature extraction model 600 and data representing one or more image features corresponding to a second image frame into the second location feature extraction model 600. In this way, the location feature extraction model 600 can provide a sequence of location features (e.g., location-feature data 404) corresponding to the sequence of image frames in the input data 204.

Figure 7:
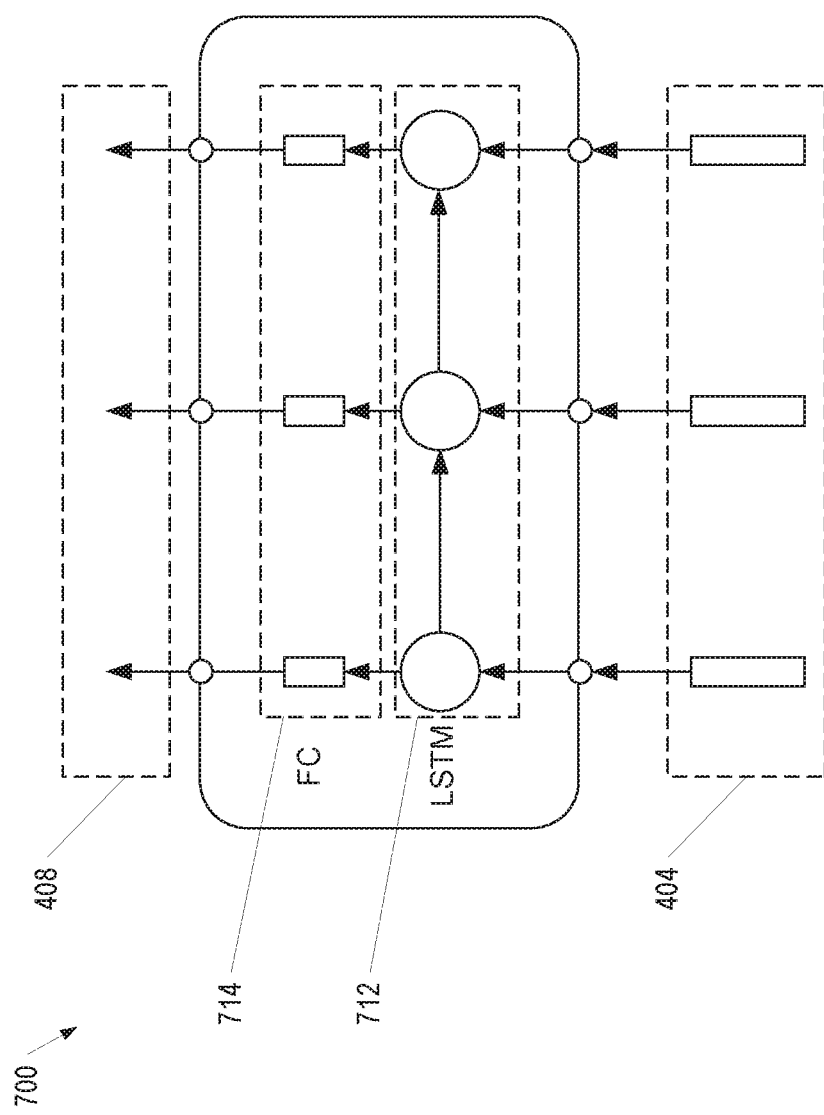
FIG. 7 depicts a block diagram of an example location prediction model, according to example embodiments of the present disclosure.

FIG. 7 depicts a block diagram of an example location prediction model 700 according to example embodiments of the present disclosure. The location prediction model 700 is similar to the location prediction model 406 of FIG. 4, except that location prediction model 700 includes a long-short term memory (LSTM) layer 712 including a plurality of LSTM blocks, and a fully connected (FC) layer 714. The location prediction model 700 is trained to receive data representing a sequence of location features corresponding to the sequence of image frames in the input data 204 (e.g., location-feature data 404), and as a result of receipt of the sequence of location features, the location prediction model 700 provides data representing a sequence of coordinates corresponding to the sequence of image frames for a classified object depicted in the sequence of image frames. The sequence of coordinates can include, for example, coordinates associated with the classified object in each image frame depicting the classified object. For example, the location prediction model 700 can receive location-feature data 404 including a sequence of location-feature embeddings, each location-feature embedding representing one or more location features corresponding to an image frame in the sequence of image frames. The location prediction model 700 can provide each location-feature embedding to corresponding LSTM block in the LSTM layer 712. The output from each LSTM block can represent a predicted location of an object in the corresponding image frame. In this way, the LSTM layer 712 can output a sequence of predicted locations for an object, the sequence of predicted locations corresponding to a predicted location of the object in each image frame in the sequence of image frames that depicts the object. The output of the LSTM layer 712 can be provided to the FC layer 714 to determine coordinate data 408 including a sequence of coordinates for the object.

In some implementations, the geolocation system 100 can use the location prediction model 700 to sequentially determine a sequence of coordinates for a plurality of classified objects depicted in the sequence of image frames in the input data 204. For example, each iteration of the location prediction model 700 can output a sequence of coordinates associated with a different object depicted in the sequence of image frames. In some implementations, the information extraction model 300 can include a plurality of location prediction models 700, and the geolocation system 100 can input the location-feature data 404 to each of the plurality of location prediction models 700 in parallel. For example, if the information extraction model 300 includes a first and second location prediction model 700, then the geolocation system 100 can simultaneously input the location-feature data 404 into the first and second location prediction models 700, and obtain a first sequence of coordinates associated with a first classified object as an output of the first location prediction model 700 and a second sequence of coordinates associated with a second classified object as an output of the second location prediction model 700.

Example Methods

Figure 8:
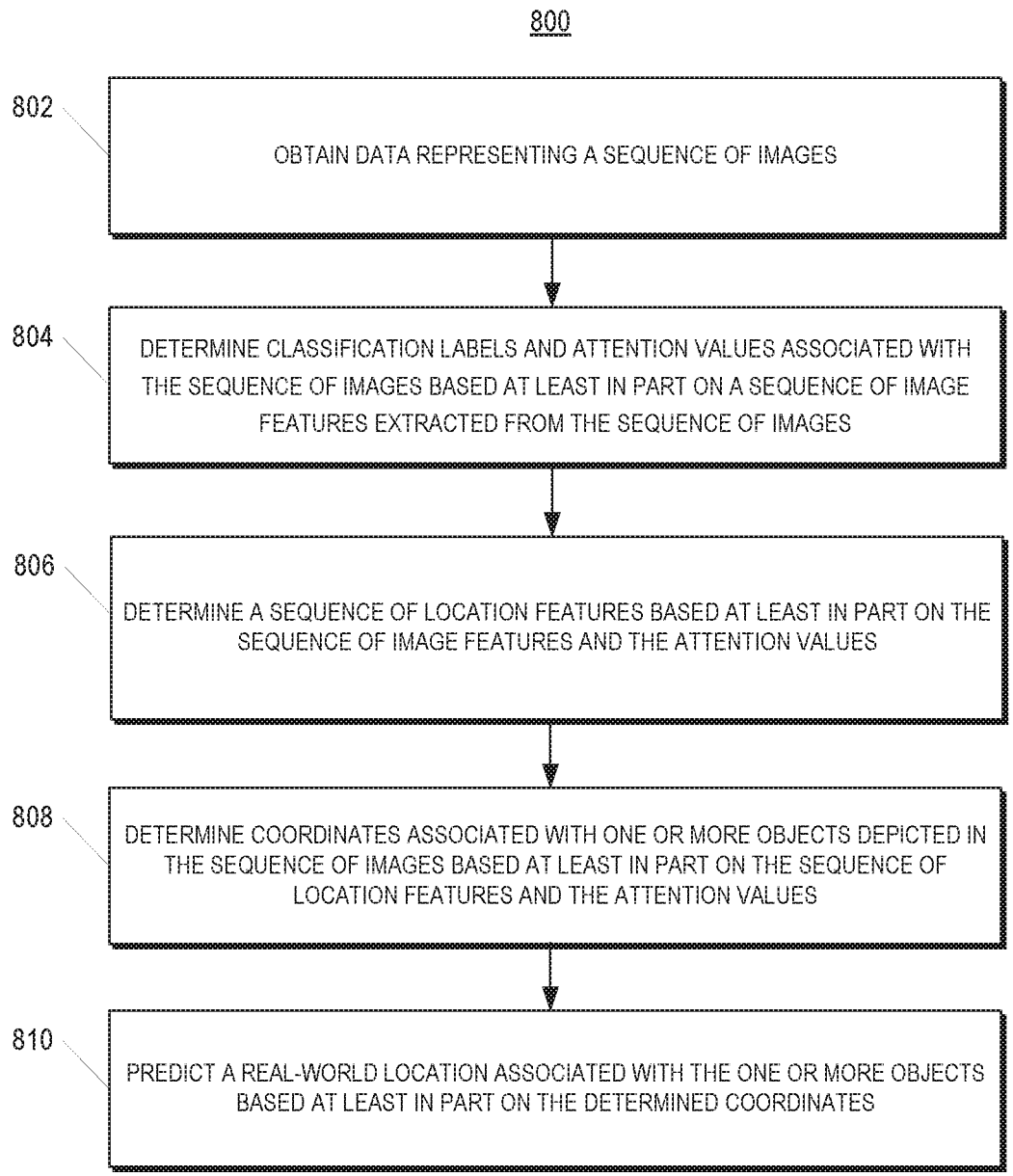
FIG. 8 depicts a flow chart diagram of an example method to extract location information from a sequence of images, according to example embodiments of the present disclosure.

FIG. 8 depicts a flow chart diagram of an example method to perform information extraction according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain data representing a sequence of images. For example, the geolocation system 100 can obtain input data 204 including data representing a sequence of images. The geolocation system 100 can input the sequence of images into a machine-learned information extraction model 120/140 that is trained to extract location information from the sequence of images. In some implementations, the sequence of images can depict a plurality of objects across multiple images in the sequence of images, and the output of the information extraction model 120/140 can include data representing a real-world location associated with the plurality of objects depicted in the sequence of images.

At 804, the computing system can determine classification labels and attention values associated with the sequence of images based at least in part on a sequence of image features extracted from the sequence of images. For example, the geolocation system 100 can determine classification data 309, temporal attention data 504 including a temporal attention value, and spatial attention data 506 including a spatial attention value associated with the sequence of images, based at least in part on data representing a sequence of image features (e.g., image-feature data 304) extracted from the sequence of images (e.g., by image-feature extraction model 302). In particular, the geolocation system 100 can input the sequence of image features into a weakly supervised object classification model 306, and obtain as an output of the object classification model 306 in response to inputting the sequence of image features, the classification data 309, temporal attention data 504, and the spatial attention data 506. The geolocation system 100 can predict the real-world location associated with an object, based at least in part on the sequence of image features, temporal attention data 504, and spatial attention data 506.

At 806, the computing system can determine a sequence of location features based at least in part on the sequence of image features and the attention values. For example, the geolocation system 100 can input data representing the sequence of image features, temporal attention data 504, and spatial attention data 506 into a frame-level location-feature extraction model 600, and obtain as an output of the frame-level location-feature extraction model 600 in response to inputting the sequence of image features, the temporal attention data 504, and the spatial attention data 506, location-feature data 404 representing a sequence of location features including one or more location features associated with the object.

At 808, the computing system can determine coordinates associated with one or more objects depicted in the sequence of images based at least in part on the sequence of location features and the attention values. For example, the geolocation system 100 can input the location-feature data 404 into a frame-level location prediction model 406, and obtain as an output of the frame-level location prediction model 406 in response to inputting the location-feature data 404, coordinate data 408 representing coordinates in a camera coordinate space associated with the object. The geolocation system 100 can determine the real-world coordinates associated with the object based at least in part on the coordinate data 408 and camera pose data associated with the object in the input data 204.

At 810, the computing system can predict a real-world location associated with the one or more objects based at least in part on the determined coordinates. For example, the geolocation system 100 can obtain as an output of the information extraction model 120/140 in response to inputting the input data 204, output data 206 representing a real-world location associated with an object depicted in the sequence of images. The geolocation system 100 can associate the predicted real-world location for the object with a classification label corresponding to the object, based at least in part on the classification data 309.

Figure 9:
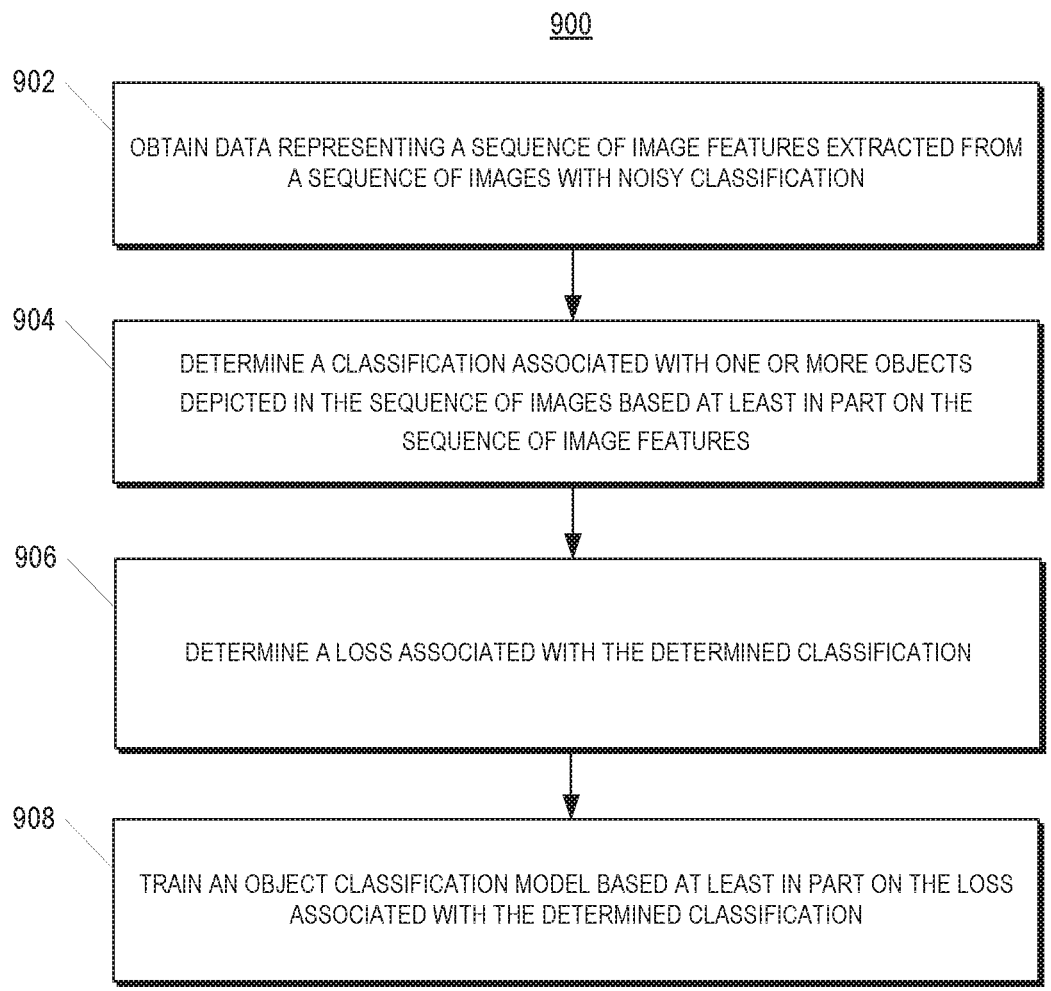
FIG. 9 depicts a flow chart diagram of an example method to train an object classification model, according to example embodiments of the present disclosure.

FIG. 9 depicts a flow chart diagram of an example method to train an information extraction model according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, a computing system (e.g., training computing system 150 or other portion of geolocation system 100) can obtain data representing a sequence of image features extracted from a sequence of images with noisy classification. For example, the geolocation system 100 can obtain image data representing a sequence of image features (e.g., image-feature data 304) extracted from a sequence of images with a single classification label associated with the sequence of images. The geolocation system 100 can input the image data into an image-feature extraction model 302, and obtain the image-feature data 304 as an output of the image-feature extraction model 302 in response to inputting the image data.

At 904, the computing system can determine a classification associated with one or more objects depicted in the sequence of images based at least in part on the sequence of image features. For example, the geolocation system 100 can input the image-feature data 304 into a weakly supervised object classification model 306, and obtain as an output of the object classification model 306 in response to inputting the sequence of image features, data representing a classification (e.g., classification data 309) associated with an object depicted in the sequence of image frames.

At 906, the computing system can determine a loss associated with the determined classification. For example, the geolocation system 100 can determine a loss associated with the classification data 309 output by the object classification model 306, based at least in part on the noisy classification associated with the sequence of images.

At 908, the computing system can train an object classification model based at least in part on the loss associated with the determined classification. For example, the geolocation system 100 can train the object classification model 306 based at least in part on the determined loss.

Figure 10:
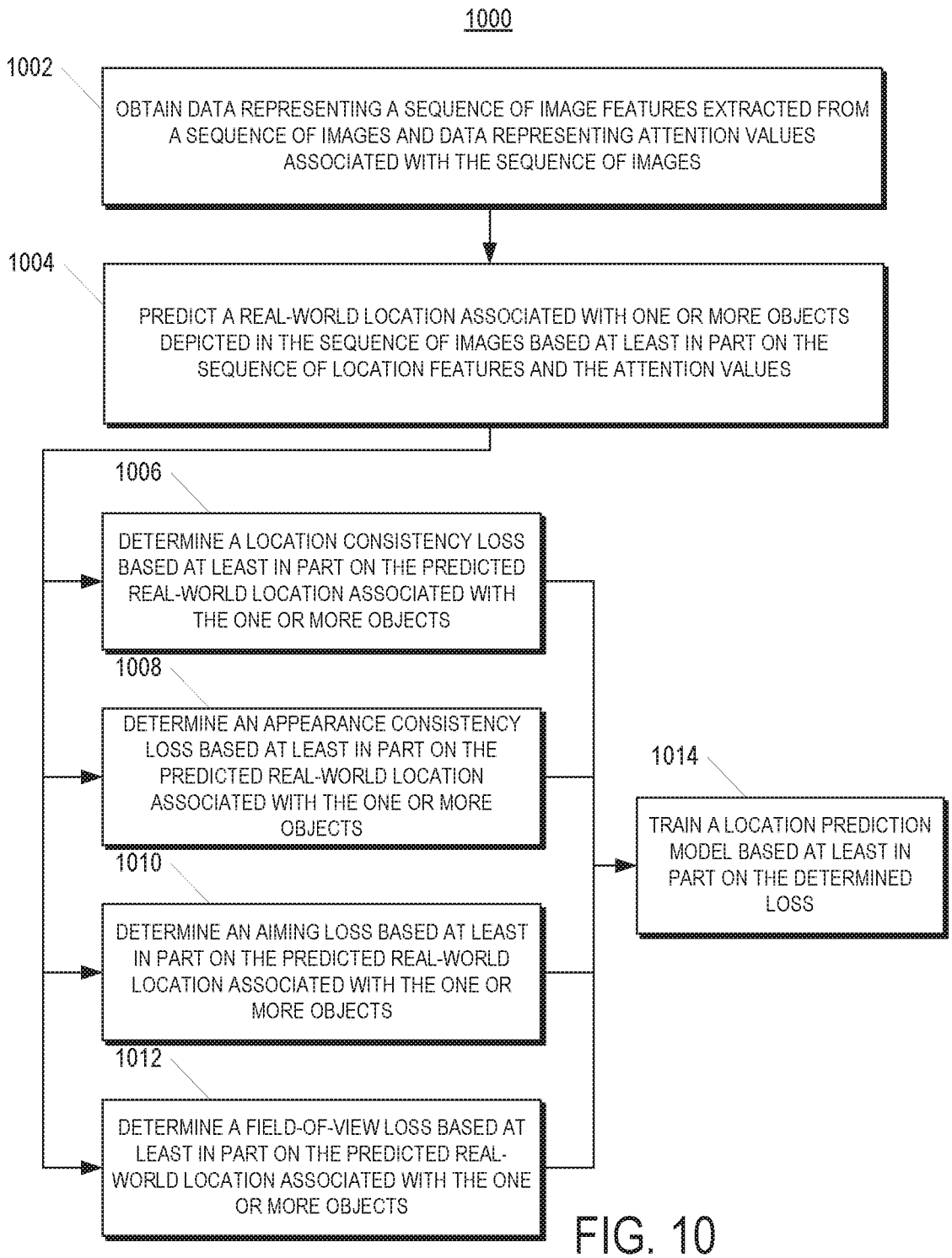
FIG. 10 depicts a flow chart diagram of an example method to train a location prediction model, according to example embodiments of the present disclosure.

FIG. 10 depicts a flow chart diagram of an example method to train an information extraction model according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system (e.g., training computing system 150 or other portion of geolocation system 100) can obtain data representing a sequence of image features extracted from a sequence of images with noisy classification and data representing attention values associated with the sequence of images. For example, the geolocation system 100 can obtain data representing a sequence of image features (e.g., image-feature data 304) extracted from a sequence of images (e.g., input data 204). The geolocation system 100 can input the input data 204 into an image-feature extraction model 302, and obtain the image-feature data 304 as an output of the image-feature extraction model 302 in response to inputting the input data 204.

At 1004, the computing system can predict a real-world location associated with one or more objects depicted in the sequence of images based at least in part on the sequence of location features and the attention values. For example, the geolocation system 100 can obtain output data 206 as an output of the information extraction model 120/140 in response to inputting the input data 204. The output data 206 can represent a real-world location associated with an object depicted in the sequence of images. In particular, the geolocation system 100 can input image-feature data 304 and attention value data 308 into a location feature extraction model 402, and as a result, obtain location-feature data 404 that includes one or more location features associated with one or more classified objects depicted in the input data 204. The geolocation system 100 can input the location-feature data 404 into a location prediction model 406, and as a result, obtain coordinate data 408 that includes coordinates associated with one or more classified objects depicted in the input data 204. The geolocation system 100 can input the coordinate data 408 and at least a portion of input data 204 (e.g., the camera pose data) into a coordinate conversion model 410, and as a result, obtain output data 206 (e.g., geolocation data) that includes a predicted real-world location (e.g., latitude and longitude) for one or more objects (e.g., street signs) depicted in the input data 204.

At 1006, the computing system can determine a location consistency loss based at least in part on the predicted real-world location associated with the one or more objects. For example, the geolocation system 100 can determining a location consistency loss based at least in part on a variance between coordinates associated with an object across multiple images in the sequence of images depicting the object.

At 1008, the computing system can determine an appearance consistency loss based at least in part on the predicted real-world location associated with the one or more objects. For example, the geolocation system 100 can determine an appearance consistency loss based at least in part on a variance between appearance features determined across multiple images in the sequence of images depicting an object.

At 1010, the computing system can determine an aiming loss based at least in part on the predicted real-world location associated with the one or more objects. For example, the geolocation system 100 can determine an aiming loss based at least in part on the coordinates in the camera coordinate space associated with the object and a spatial attention associated with the object across multiple images in the sequence of images depicting an object.

At 1012, the computing system can determine a field-of-view loss based at least in part on the predicted real-world location associated with the one or more objects. For example, the geolocation system 100 can determine a field-of-view loss based at least in part on the real-world coordinates associated with the object and a field-of-view associated with a camera used to capture the sequence of images depicting an object.

At 1014, the computing system can train a location prediction model based at least in part on the determined loss. For example, the geolocation system 100 can train the location prediction model 406 based at least in part on the location consistency loss, the appearance consistency loss, the aiming loss, and/or the field-of-view loss.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8 through 10 respectively depict steps performed in a particular order for purposes of illustration and discussion, the methods of the present disclosure are not limited to the particularly illustrated order or arrangement. The various steps of the methods 800, 900, and 1000 can be omitted, rearranged, combined, and/or adapted in various ways without deviating from the scope of the present disclosure.

What is claimed is:

1. A computer-implemented method for extracting information from imagery, the method comprising:
    obtaining, at a computing system comprising one or more processors, data representing a sequence of images, at least one of the sequence of images depicting an object;
    inputting, by the computing system, the sequence of images into a machine-learned information extraction model that is trained to extract location information from the sequence of images; and
    obtaining as an output of the information extraction model in response to inputting the sequence of images, by the computing system, data representing a real-world location associated with the object depicted in the sequence of images,
    wherein
    the information extraction model includes a weakly supervised object classification model trained using image data with weak classification labels, and
    inputting, by the computing system, the sequence of images into the machine-learned information extraction model that is trained to extract the location information from the sequence of images comprises:
        inputting, by the computing system, a sequence of image features extracted from the data representing the sequence of images, into the object classification model, and
        obtaining, as an output of the object classification model in response to inputting the sequence of image features, a classification associated with the object depicted in the sequence of images and classification data including one or more classification labels associated with the object.

2. The computer-implemented method of claim 1, wherein
    inputting, by the computing system, the sequence of images into the machine-learned information extraction model that is trained to extract the location information from the sequence of images comprises:
        determining, by the object classification model, the classification associated with the object depicted in the sequence of images based on the classification data; and
        determining, by the object classification model, temporal attention data and spatial attention data associated with the sequence of images, based at least in part on data representing the sequence of image features extracted from the data representing the sequence of images; and
    obtaining as the output of the information extraction model in response to inputting the sequence of images, by the computing system, the data representing the real-world location associated with the object depicted in the sequence of images comprises:
        predicting, by the computing system, the real-world location associated with the object, based at least in part on the sequence of image features, the temporal attention data, and the spatial attention data.

3. The computer-implemented method of claim 2, wherein
    the object classification model comprises a long-short term memory (LSTM) layer including a plurality of LSTM blocks, and
    determining, by the object classification model, the temporal attention value data and the spatial attention data associated with the sequence of images comprises:
        obtaining, as an output of the object classification model in response to inputting the sequence of image features, the temporal attention data and the spatial attention data.

4. The computer-implemented method of claim 2, wherein
the object classification model comprises a fully connected layer,
obtaining, as the output of the object classification model in response to inputting the sequence of image features, the classification associated with the object depicted in the sequence of images and the classification data including one or more classification labels associated with the object, comprises:
determining, by each LSTM block in the LSTM layer, a per-frame embedding based at least in part on the image features extracted from the data representing the sequence of images,
providing the per-frame embeddings to the FC layer,
determining, by the FC layer, one or more objects that persist across the sequence of images, and
weighing the per-frame embeddings based on the temporal attention data to determine the classification data.

5. The computer-implemented method of claim 4, further comprising:
determining, by the computing system, a loss associated with the classification obtained by the object classification model, based at least in part on the one or more classification labels associated with the object; and
training, by the computing system, the object classification model based at least in part on the determined loss.

6. The computer-implemented method of claim 2, wherein predicting the real-world location associated with the object comprises:
inputting, by the computing system, the sequence of image features, the temporal attention data, and the spatial attention data into a frame-level location-feature extraction model;
obtaining as an output of the frame-level location-feature extraction model in response to inputting the sequence of image features, the temporal attention data, and the spatial attention data, by the computing system, data representing a sequence of location features including one or more location features associated with the object;
inputting, by the computing system, the sequence of location features into a frame-level location prediction model;
obtaining as an output of the frame-level location prediction model in response to inputting the sequence of location features, by the computing system, data representing coordinates in a camera coordinate space associated with the object; and
determining, by the computing system, real-world coordinates associated with the object based at least in part on the coordinates in the camera coordinate space and camera pose data associated with the object.

7. The computer-implemented method of claim 6, further comprising:
determining, by the computing system, a location consistency loss based at least in part on a variance between coordinates associated with the object across a plurality of multiple images among the sequence of images depicting the object; and
training, by the computing system, the frame-level location prediction model based at least in part on the location consistency loss.

8. The computer-implemented method of claim 6, further comprising:
determining, by the computing system, an appearance consistency loss based at least in part on a variance between appearance features determined across a plurality of images among the sequence of images depicting the object; and
training, by the computing system, the frame-level location prediction model based at least in part on the appearance consistency loss.

9. The computer-implemented method of claim 6, further comprising:
determining, by the computing system, an aiming loss based at least in part on the coordinates in the camera coordinate space associated with the object and a spatial attention associated with the object across a plurality of images among the sequence of images depicting the object; and
training, by the computing system, the frame-level location prediction model based at least in part on the aiming loss.

10. The computer-implemented method of claim 6, further comprising:
determining, by the computing system, a field-of-view loss based at least in part on the real-world coordinates associated with the object and a field-of-view associated with a camera used to capture the sequence of images depicting the object; and
training, by the computing system, the frame-level location prediction model based at least in part on the field-of-view loss.

11. The computer-implemented method of claim 6, wherein
the frame-level location prediction model comprises a long-short term memory (LSTM) layer including a plurality of LSTM blocks and a fully connected layer, and
obtaining, as the output of the frame-level location prediction model in response to inputting the sequence of location features, data representing coordinates in the camera coordinate space associated with the object, comprises:
providing a location-feature embedding to corresponding LSTM blocks in the LSTM layer,
outputting, by the LSTM layer, a sequence of predicted locations for the object, the sequence of predicted locations corresponding to a predicted location of the object in each image among the sequence of images depicting the object, and
determining, by the fully connected layer, coordinate data including a sequence of coordinates associated with the object.

12. The computer-implemented method of claim 1, wherein the sequence of images depict a plurality of objects across multiple images in the sequence of images, and the output of the information extraction model includes data representing a real-world location associated with the plurality of objects depicted in the sequence of images.

13. A computing system, the system comprising:
one or more processors;
one or more machine-learned information extraction models; and
a computer-readable medium having instructions stored thereon that, when executed by the one or more processors, cause the system to perform the method of claim 1.

14. One or more tangible, non-transitory computer-readable media storing one or more machine-learned information extraction models and computer-readable instructions that when executed by one or more processors cause the one or more processors to perform operations according to claim 1.

15. The computer-implemented method of claim 1, wherein the information extraction model is trained based on at least one of a location consistency loss, an appearance consistency loss, an aiming loss, and a field-of-view loss determined for the object across a plurality of images among the sequence of images depicting the object.

16. A computer-implemented method for training an information extraction model to determine data representing a real-world location associated with an object depicted in a sequence of images, the information extraction model comprising:
    an image-feature extraction model;
    a weakly supervised object classification model trained using image data with weak classification labels;
    a geolocation prediction model;
    the method comprising, at a computing system comprising one or more processors:
        obtaining data representing a sequence of images with noisy classification, at least one of the sequence of images depicting the object;
        outputting, by the image-feature extraction model in response to inputting the sequence of images, a sequence of image features extracted from the data representing the sequence of images with noisy classification;
        outputting, by the object classification model in response to inputting the sequence of image features, classification data including a classification associated with the object depicted in the sequence of images and one or more classification labels associated with the sequence of images, wherein the classification data is determined based at least in part on temporal attention data and spatial attention data associated with the sequence of image features, the one or more temporal attention data and the spatial attention data being determined by the object classification model;
        training the object classification model based at least in part on the classification data and the noisy classification associated with the sequence of images;
        outputting, by the geolocation prediction model in response to inputting the sequence of image features, the temporal attention data, and the spatial attention data, the real-world location associated with the object depicted in the sequence of images; and
        training the geolocation prediction model using at least the sequence of image features, the temporal attention data, and the spatial attention data.

17. A computer-implemented method for extracting information from imagery, the method comprising:
    obtaining, at a computing system comprising one or more processors, data representing one or more images, at least one of the one or more of images depicting an object;
    inputting, by the computing system, the one or more images into a machine-learned information extraction model that is trained to extract location information from the one or more images; and
    obtaining as an output of the information extraction model in response to inputting the one or more images, by the computing system, data representing a real-world location associated with the object depicted in the one or more images, wherein
    the information extraction model includes a weakly supervised object classification model trained using image data with weak classification labels, and
    inputting, by the computing system, the one or more images into the machine-learned information extraction model that is trained to extract the location information from the one or more images comprises:
        inputting, by the computing system, a sequence of image features extracted from the data representing the one or more images, into the object classification model, and
        obtaining, as an output of the object classification model in response to inputting the sequence of image features, a classification associated with the object depicted in the one or more images and classification data including one or more classification labels associated with the object.

* * * * *